(12) United States Patent
Grumann et al.

(10) Patent No.: US 8,683,809 B2
(45) Date of Patent: Apr. 1, 2014

(54) FOSSIL-FUELED POWER STATION COMPRISING A CARBON DIOXIDE SEPARATION DEVICE AND METHOD FOR OPERATING A FOSSIL-FUELED POWER STATION

(75) Inventors: Ulrich Grumann, Erlangen (DE); Ulrich Much, Erlangen (DE); Andreas Pickard, Adelsdorf (DE); Mike Rost, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/503,453

(22) PCT Filed: Oct. 29, 2010

(86) PCT No.: PCT/EP2010/066518
§ 371 (c)(1),
(2), (4) Date: Jun. 28, 2012

(87) PCT Pub. No.: WO2011/051473
PCT Pub. Date: May 5, 2011

(65) Prior Publication Data
US 2012/0261922 A1 Oct. 18, 2012

(30) Foreign Application Priority Data
Nov. 2, 2009 (DE) .................. 10 2009 051 640

(51) Int. Cl.
*F02C 6/18* (2006.01)

(52) U.S. Cl.
USPC .............. 60/772; 60/39.182; 60/39.5; 60/670

(58) Field of Classification Search
USPC ................ 60/39.182, 39.5, 772, 775; 95/236; 423/220–229
See application file for complete search history.

(56) References Cited

U.S. PATENT DOCUMENTS 7,559,977 B2 7/2009 Fleischer et al.
2008/0011161 A1* 1/2008 Finkenrath et al. ................. 96/4

FOREIGN PATENT DOCUMENTS

| EP | 1473072 A1 | 11/2004 |
| WO | WO 2005045316 A2 | 5/2005 |
| WO | WO 2011039263 A1 | 4/2011 |

* cited by examiner

*Primary Examiner* — Gerald L Sung
*Assistant Examiner* — Scott Walthour

(57) ABSTRACT

A fossil-fueled power station including a steam generator is provided. A steam turbine is mounted downstream of the steam generator via a hot intermediate superheater line and a carbon dioxide separation device. The carbon dioxide separation device is connected to the hot intermediate superheater line via a process steam line and a backpressure steam turbine is mounted into the process steam line.

6 Claims, 1 Drawing Sheet

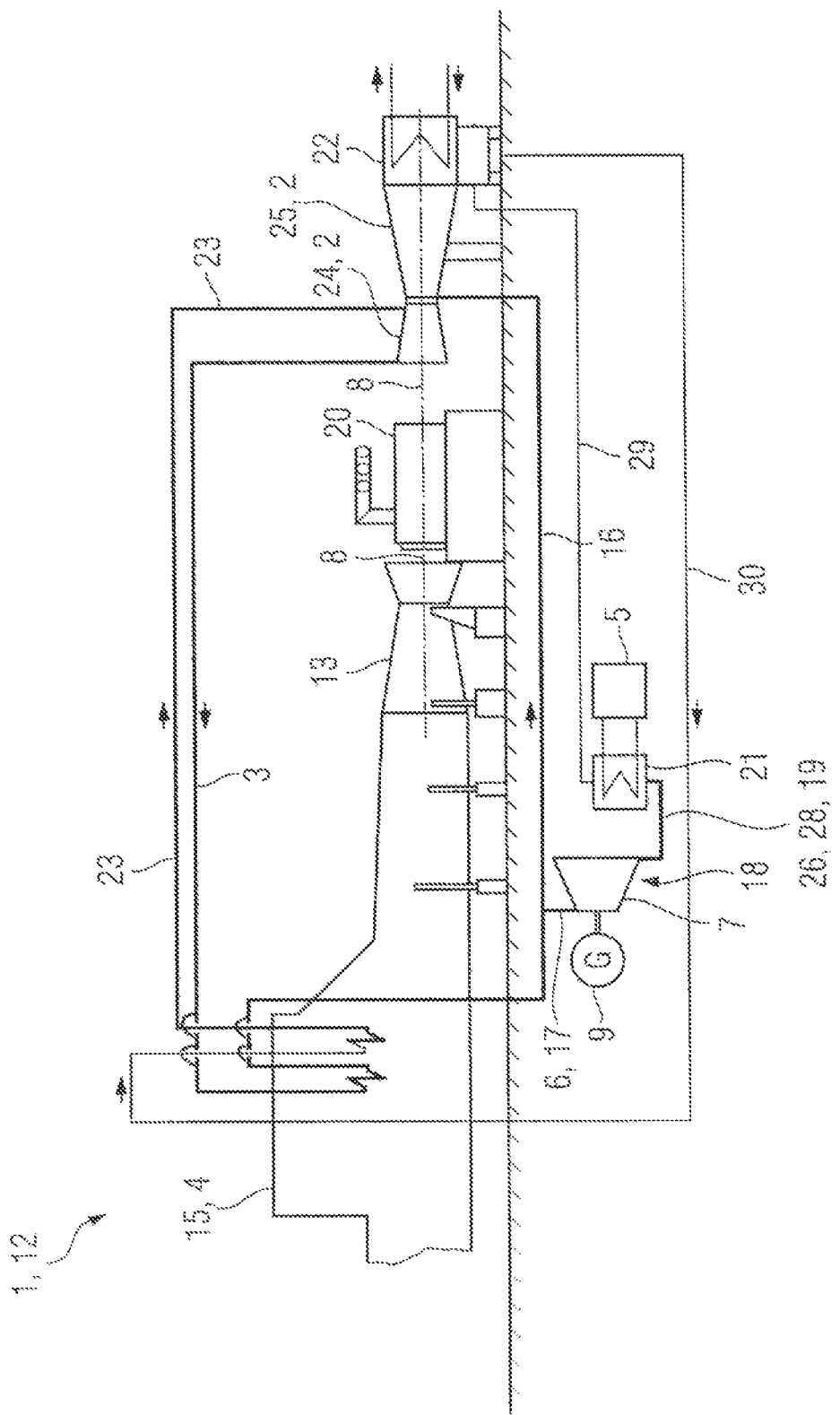

FOSSIL-FUELED POWER STATION COMPRISING A CARBON DIOXIDE SEPARATION DEVICE AND METHOD FOR OPERATING A FOSSIL-FUELED POWER STATION

CROSS REFERENCE TO RELATED APPLICATIONS

This application is the US National Stage of International Application No. PCT/EP2010/066518, filed Oct. 29, 2010 and claims the benefit thereof. The International Application claims the benefits of German application No. 10 2009 051 640.9 DE filed Nov. 2, 2009. All of the applications are incorporated by reference herein in their entirety.

FIELD OF INVENTION

A fossil-fueled power station including a steam generator, a steam turbine mounted downstream of the steam generator via a hot intermediate superheater line and a carbon dioxide separation device is provided. The carbon dioxide separation device is connected to the hot intermediate superheater line via a process steam line and a backpressure steam turbine is mounted into the process steam line.

BACKGROUND OF INVENTION

The separation of carbon dioxide out of the exhaust gases from fossil-fueled power stations, such as for example combined cycle gas turbine (CCGT) power stations or coal-fired steam turbine power stations, requires a large amount of energy.

If use is made of a wet-chemical absorption-desorption method for the separation of carbon dioxide, this energy must be supplied in the form of thermal energy for heating the desorption process. Usually, low-pressure steam from the power station's steam circuit is used for this purpose.

Even if a power station which is in the course of being built is not yet equipped with a carbon dioxide separation device connected into it, there is nowadays already an obligation to demonstrate that it can be retrofitted (capture readiness). Accordingly, appropriate provisions are nowadays already being made so that at a later point in time a carbon dioxide separation device can be integrated into the power station without any problems. This type of provision also affects, for example, the machine housing, which must be appropriately enlarged for the extraction of the low pressure steam.

In addition, there is a requirement that the steam turbine, or the power station process, must be appropriately configured for the extraction of low pressure steam. In the case of steam turbines with separate housings for the medium- and low-pressure stages, the extraction of low pressure steam at the overflow line is an easy possibility. On the other hand, in the case of steam turbines with a single-housing medium- and low-pressure stage, it is not possible to extract the required large quantity of steam from the turbine at a suitable pressure.

The extraction of steam from other sources within the power station process is often not to be recommended, or is not possible in a suitable way. Thus, for example, extraction from a reheater line on the steam turbine produces an unbalanced load on the boiler. Extraction of higher grade steam for the carbon dioxide separation device must also be excluded, because this leads to unacceptable energy losses.

SUMMARY OF INVENTION

It is therefore the object of the invention to specify a device and a method for a fossil-fueled power station, for providing low pressure steam for a carbon dioxide separation device from a source other than the overflow line between the medium- and low-pressure stages, so that an unbalanced load in the power station process is avoided and the energy losses due to the extraction of the steam are largely minimized.

That object of the invention which relates to a device is achieved by the characteristics of the claims.

The invention starts with a steam turbine which has a single-housing medium- and low-pressure stage. Apart from the medium- and low-pressure stages, the steam turbine also incorporates a high pressure stage in a separate housing. In this case, provision is made so that, after it emerges from the high pressure stage, the live steam for the high pressure stage is fed back via a steam return line (cold reheater line) into the boiler for reheating, is reheated and is fed into the medium pressure stage of the steam turbine via a hot reheater line. In accordance with the invention, provision is now made so that a process steam line, which is connected to the carbon dioxide separation device, is connected to the hot reheater line with a back-pressure steam turbine being connected into the process steam line. The back-pressure steam turbine brings the process steam which has been extracted to the condition for process steam (saturated steam). The boiler must be appropriately designed for the extraction of the steam.

In an advantageous development of the fossil-fueled power station, the process steam which has been extracted is converted to electrical power by a generator connected to the back-pressure steam turbine. By this means, the excess energy in the process steam can be used for the generation of electrical power.

In an expedient embodiment of the fossil-fueled power station, the carbon dioxide separation process consists of an absorption unit and a desorption unit. The process steam line is then connected to the input side on a heat exchanger in the desorption unit. On the output side, the desorption unit is connected to a condensate return line.

That object of the invention which relates to a method is achieved by the characteristics of the claims.

In an analogous way as with the device, in the case of the inventive method the process steam is extracted from the hot reheater line. The process steam is in this case expanded in an expansion process, which produces expanded steam (saturated steam). The expanded steam is then fed to the carbon dioxide separation device.

It is advantageous if the expansion process is used for the generation of electrical power. The expanded steam is preferably used for the desorption of carbon dioxide in a carbon dioxide separation process.

The preparatory measures for "capture ready" are reduced by the invention to an appropriate boiler design and a connection point outside the system-critical machine housing. When a carbon dioxide separation device is retrofitted, the steam turbine can be thermodynamically optimized for the separation process then used. The connection of the back-pressure turbine before the reheater leads to lower temperature steam, which can be expanded with no problem using standard industrial turbines.

BRIEF DESCRIPTION OF THE DRAWINGS

The invention is explained in more detail below by reference to a drawing.

DETAILED DESCRIPTION OF INVENTION

The figure shows the essentials of a fossil-fueled power station 1 with a heat exchanger 21 connected to a carbon dioxide separation device 5. The fossil-fueled power station 1 is here in the form of a combined cycle gas turbine (CCGT) power plant 12. The combined cycle gas turbine plant 12 is shown in simplified form, and here consists of a gas turbine 13, a steam turbine 2, a generator 20, and a steam generator 4 connected in the exhaust gas duct of the gas turbine, in the form of a heat recovery steam generator 15. The steam turbine 2 consists of a high pressure stage 24 and a medium- and low-pressure stage 25. The gas turbine 13, the generator 20 and the steam turbine 2 are located on a common shaft 8. Connected downstream from the steam turbine 2 is a condenser 22.

The high pressure stage 24 has a live steam feed connection from the steam generator 4 via a live steam line 23 and a steam return feed connection via a steam return line (cold reheater line) 3. Connected to the steam generator 4 there is also a hot reheater line 16, which is connected to the medium- and low-pressure part 25 of the steam turbine 2.

Connected to the hot reheater line 16 is a process steam line 6 for tapping off process steam 17. In addition to the steam turbine 2, a back-pressure steam turbine 7 is provided, this having a process steam feed connection from the process steam line 6. Expansion of the process steam 17 takes place in the back-pressure steam turbine 7, to form saturated steam 26. In the course of this, the process steam 17 is converted to electrical power by a generator 9 connected to the back-pressure steam turbine 7. When the steam is extracted from the hot reheater line, its temperature on exiting from the back-pressure steam turbine is about 290° C.

Connected to the back-pressure steam turbine 7 is a heat exchanger 21 in a carbon dioxide separation device 5. Here, the carbon dioxide separation device 5 is not shown in more detail. The back-pressure steam turbine 7 is connected to the desorption unit of the carbon dioxide separation device 5 via a saturated steam line 28. In the desorption unit, the saturated steam 26 promotes the boiling off of a solvent to release carbon dioxide.

From the heat exchanger 21, a condensate is fed out into the condenser 22 via a condensate return line 29. For this purpose, the condensate return line 29 has an appropriate connection to the condenser 22. Finally, a condensate line 30 is provided, connecting the condenser 22 to the steam generator 4, to close the feedwater circuit.

The invention claimed is:

1. A fossil-fueled power station, comprising:
    a steam generator;
    a live steam line;
    a hot reheater line;
    a first steam turbine having a high pressure stage connected to the steam generator via the live steam line and having a medium- and low-pressure stage, the first steam turbine also connected to the downstream side of the steam generator via the hot reheater line;
    a cold reheater steam return line extending from the first steam turbine to the steam generator;
    a condenser connected downstream from the first steam turbine;
    a carbon dioxide separation device comprising a heat exchanger, the carbon dioxide separation device connected via a process steam line to the hot reheater line of the steam generator;
    a condensate line extending from the heat exchanger to the condenser; and
    a back-pressure steam turbine, separate and distinct from the first steam turbine, connected to the process steam line and positioned between the hot reheater line and the carbon dioxide separation device, a portion of the hot reheater line and the first steam turbine extending along a first path to the condenser, with the process steam line, the back-pressure steam turbine, the heat exchanger and the condensate line extending along a second path to the condenser parallel to the first path.

2. The fossil-fueled power station as claimed in claim 1, wherein the back-pressure steam turbine is joined by a shaft to a generator for the purpose of generating electricity.

3. The fossil-fueled power station as claimed in claim 1, wherein the power station is in the form of a combined cycle gas turbine power plant, incorporating a gas turbine, and wherein the steam generator is a heat recovery steam generator.

4. A method for operating a fossil-fueled power station, with a steam generator, comprising:
    connecting a first steam turbine having a high pressure stage connected to the steam generator via a live steam line, the first steam turbine further including a medium- and low-pressure stage, the first steam turbine also connected to the downstream side of the steam generator via a hot reheater line;
    connecting a heat exchanger in a carbon dioxide separation device to the hot reheater line of the steam generator via a process steam line;
    extracting reheated steam from the hot reheater line in the form of process steam;
    expanding the process steam in an expansion process in a back-pressure steam turbine, separate and distinct from the first steam turbine, wherein expanded steam is formed;
    feeding the expanded steam to the carbon dioxide separation device with the back-pressure steam turbine connected to receive steam via a process steam line from the hot reheater line, the back-pressure steam turbine positioned between the hot reheater line and the carbon dioxide separation device; and
    providing a condenser connected downstream from the first steam turbine wherein a condensate line extends from the heat exchanger to the condenser.

5. The method as claimed in claim 4, wherein the expansion process also incorporates a generator, and is used for the generation of electrical power.

6. The method as claimed in claim 4, wherein the expanded steam is used for the desorption of carbon dioxide.

* * * * *